June 18, 1929.  C. WALTHALL  1,717,952
COMPOUND EXTENSION SWEEP
Filed Dec. 8, 1927
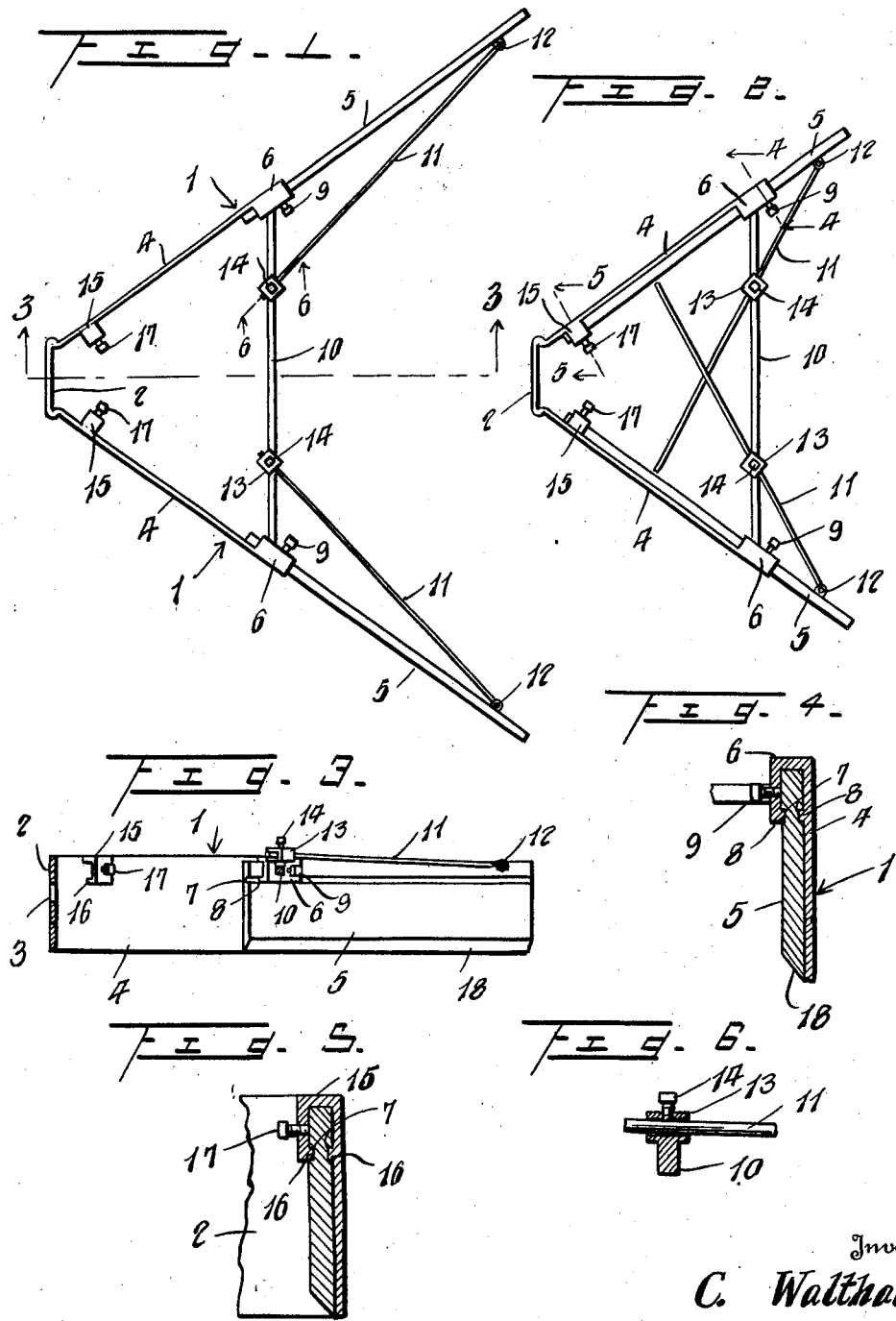

Patented June 18, 1929.

1,717,952

UNITED STATES PATENT OFFICE.

CLAYTON WALTHALL, OF DOUGLASSVILLE, TEXAS.

COMPOUND EXTENSION SWEEP.

Application filed December 8, 1927. Serial No. 238,610.

This invention relates to sweeps for agricultural implements, and has for one of its objects to provide a novel, simple and highly efficient device of this character which shall be adapted for use in connection with cultivators and single stock plows, which shall be adapted to be readily and firmly secured to a cultivator or plow standard, and which shall embody blades adapted to extend in rearwardly divergent relation from the standard.

A further object of the invention is to provide a sweep of the character stated wherein the blades shall embody sections connected together in a manner to permit the length of the blades to be varied.

With the foregoing and other objects in view, the nature of which will appear as the description proceeds, the invention consists in the construction, combination and arrangement of parts hereinafter fully described and claimed, and illustrated in the accompanying drawing, wherein:

Figure 1 is a top plan view of the sweep with the blades thereof adjusted to their full length, Figure 2 is a similar view of the sweep with the blades adjusted to their shortest length, Figure 3 is a sectional view taken on the plane indicated by the line 3—3 of Figure 1, Figure 4 is a sectional view taken on the plane indicated by the line 4—4 of Figure 2, Figure 5 is a sectional view taken on the plane indicated by the line 5—5 of Figure 2, and Figure 6 is a sectional view taken on the plane indicated by the line 6—6 of Figure 1.

The sweep comprises a pair of blades 1 which, when the sweep is applied to the standard of a cultivator or plow, extend in rearwardly divergent relation from the lateral sides of the standard. The blades 1 are connected at their front ends by a strap 2 through the medium of which the sweep is secured to the standard. The strap 2 is provided with an opening 3 for the reception of the bolt used to secure the sweep to the standard. The front ends of the blades 1 contact with the lateral sides if the standard and hold the sweep against rocking movement on the bolt.

The blades 1 comprise fixed sections 4 and adjustable sections 5. The sections 4 are fixed at their front ends to the strap 2, and the sections 5 are slidably connected to the inner sides of the sections 4 by guides 6. The guides 6 are preferably formed integrally with the upper edges of the sections 4, and they are located at the rear ends of the sections. The upper edges of the sections 5 fit in the guides 6, and these sections are provided with horizontal grooves 7 for the reception of horizontal ribs 8 formed on the opposing sides of the sections 4 and the guides. Set screws 9 carried by the guides 6 and contacting with the sections 5, hold the sections in their adjusted position with respect to the sections 4.

The sections 4 are held against any relative lateral movement by a cross bar 10 which is positioned between and secured at its ends to the guides 6. The sections 5 are held against any relative lateral movement by the guides 6 and by brace bars 11 which are pivotally connected as at 12 to the sections and which slidably pass through eyes 13 carried by and extending upwardly from the bar 10. Set screws 14 carried by the eyes 13 and contacting with the rods 11, hold the rods against casual movement with respect to the eyes. The rods 11 are connected at their rear ends to the rear end portions of the sections 5, and they extend inwardly and forwardly from the sections to and through the eyes 13.

Due to the manner in which the sections 5 are secured to the sections 4, the sections 5 may be adjusted forwardly and rearwardly with respect to the sections 4 so as to vary the length of the blades 1. The sections 5 in any adjusted position thereof are positively held against casual relative movement and against casual movement with respect to the sections 4 by means of the guides 6, rods 11, the ribs 8, and the set screws 9 and 14. When the sections 5 are in their foremost adjusted position with respect to the sections 5, their front ends are positioned in clamps 15 carried by the sections 4. The clamps 15 are preferably formed integrally with the upper edges of the sections 4, and they are located near the front ends of the sections. The opposing sides of the sections and clamps 15 are provided with ribs 16 for engagement in the grooves 7 of the sections 5, and the clamps are provided with set screws 17 for contact with the sections 5. The clamps 15 hold the front ends of the sections 5 against inward movement with respect to the sections 4.

The sections 4 and 5 are of the same width, their lower ends are bevelled as at 18, and the sections 5 are slightly longer than the sections 4. The sections 5 are also slightly thicker than the sections 4 in order to prevent the inward flexing of those parts thereof that extend rearwardly beyond the sections 4.

From the foregoing description, taken in connection with the accompanying drawing, it will be understood that the sweep may be easily and quickly secured to a cultivator or plow standard, that its blades may be readily varied as to length, and that it may be manufactured and sold at a comparatively low cost.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A sweep comprising angularly related front blade sections, a member connecting the front ends of the blade sections, guides carried by the blade sections, a cross bar secured to and between the guides, rear blade sections slidably associated with the guides, rods connected to the rear blade sections, means adjustably connecting the rods to the bar.

2. A sweep comprising angularly related front blade sections, a trap connecting the front ends of the blade sections, guides mounted on the rear ends of the blade sections, clamps secured to the blade sections near the front ends of the latter, rear blade sections slidably associated with the guides, a cross bar secured to and between the guides, rods connected to the rear blade sections, and means adjustably connecting the rods to the cross bar.

3. A sweep comprising angularly related front blade sections, a strap connecting the front ends of the blade sections, guides mounted on the rear ends of the blade sections, clamps secured to the blade sections near the front ends of the latter, rear blade sections slidably associated with the guides, a cross bar secured to and between the guides, rods connected to the rear blade sections, and means adjustably connecting the rods to the cross bar, the rear blade sections being provided with horizontal grooves and the guides being provided with ribs fitting in said grooves.

4. A sweep comprising a front blade section, a rear blade section, means connecting the rear blade section to the front blade section for endwise adjustment with respect thereto, brace means connected to the rear end of the rear blade section and adjustably connected to the front blade section, and securing means carried by the front blade section and adapted to receive the front end of the rear blade section in one adjusted position of the rear blade section.

In testimony whereof I affix my signature.

CLAYTON WALTHALL.